United States Patent
Ward

(10) Patent No.: US 6,709,315 B1
(45) Date of Patent: Mar. 23, 2004

(54) AUTO FEED SYSTEM FOR COMPRESSED PROPELLANT TOOLS AND PRESSURE COMPENSATING VALVE THEREFORE

(76) Inventor: John D. Ward, 4355 Pacific St., Rocklin, CA (US) 95677

( * ) Notice: Subject to any disclaimer, the term of this patent is extended or adjusted under 35 U.S.C. 154(b) by 0 days.

(21) Appl. No.: 10/057,175

(22) Filed: Jan. 24, 2002

(51) Int. Cl.[7] .............................................. B24B 49/00
(52) U.S. Cl. ........................... 451/24; 451/295; 125/14
(58) Field of Search .............................. 125/12, 36, 14; 451/26, 295, 24

(56) References Cited

U.S. PATENT DOCUMENTS

| | | | |
|---|---|---|---|
| 2,909,084 A | | 10/1959 | Svenson |
| 3,722,497 A | * | 3/1973 | Hiestand et al. .............. 125/14 |
| 3,848,648 A | | 11/1974 | Dika |
| 3,877,180 A | * | 4/1975 | Brecker ........................ 451/24 |
| 4,064,950 A | | 12/1977 | Salmi |
| 4,083,291 A | | 4/1978 | Larsson |
| 4,748,966 A | * | 6/1988 | Kennedy ..................... 125/14 |
| 4,756,298 A | | 7/1988 | Spiegelberg |
| 4,821,625 A | | 4/1989 | Sundberg |
| 4,848,845 A | * | 7/1989 | Kennedy .................. 299/39.3 |
| 5,788,428 A | | 8/1998 | Ward |
| 6,041,683 A | | 3/2000 | Timperi |

FOREIGN PATENT DOCUMENTS

| | | |
|---|---|---|
| DE | 4302755 | 8/1994 |
| FR | 2425293 | 12/1979 |
| WO | WO 9912410 | 3/1999 |
| WO | WO 0198045 | 12/2001 |

* cited by examiner

*Primary Examiner*—Dung Van Nguyen
(74) *Attorney, Agent, or Firm*—Heisler & Associates

(57) ABSTRACT

An automatic feed system 10 is provided for advancing a hydraulically powered work head into a workpiece being cut. A hydraulic fluid powered work head motor 40 drives a diamond drill cutting tool 46 or other cutting tool to cut the workpiece, such as concrete G. Hydraulic pressure in an inlet line 42 feeding hydraulic fluid to the work head motor 40 is monitored to detect when high torque and hence high wearing forces are experienced by the diamond cutting tool 46. A feed motor 30 or other advance is provided to feed the diamond cutting tool 46 into the workpiece. A valve 50 is provided which is pressure sensitive and controls the feed rate of the feed motor 30 in response to pressure in the inlet line 42 delivering hydraulic fluid to the work head motor 40. In this way, a feed rate of the bit 46 or other cutting tool into the workpiece is reduced when high stress conditions exist on the cutting surface of the diamond drill cutting tool 46 or other cutting tool.

22 Claims, 4 Drawing Sheets

AUTO FEED SYSTEM FOR COMPRESSED PROPELLANT TOOLS AND PRESSURE COMPENSATING VALVE THEREFORE

FIELD OF THE INVENTION

The following invention relates to systems for feeding hydraulic fluid or other compressed propellant powered tools into a workpiece to be cut. More particularly, this invention relates to feed systems which automatically adjust a rate at which a hydraulic fluid powered work head advances into a workpiece in response to a hydraulic pressure in an inlet line feeding hydraulic fluid to the work head of the tool, so that maximum torque thresholds for the work head are not exceeded.

BACKGROUND OF THE INVENTION

When a workpiece is to be cut with a powered work head, it is important that the work head not cut the workpiece in a manner which exerts more forces on the work head than the maximum forces for which the work head is designed, so that the work head does not experience premature wear. When the workpiece is concrete or other hard materials, the importance of not exceeding these maximum forces is particularly great. Concrete is typically cut with diamond tipped work heads, such as drill bits or saw blades, which are relatively expensive and susceptible to damage when forces experienced at the tip of the work head exceed forces with which the diamonds are bonded to the work head.

Typically, the work head is rotated by an output shaft from a motor, causing the work head, such as the saw blade or drill bit, to rotate relative to the workpiece. The work head can be rotated by a variety of different motors. One motor which is desirable in many workpiece cutting applications is a hydraulic motor which has elevated pressure hydraulic fluid delivered to the work head motor through an inlet line to power the work head motor. When the work head is driven by a hydraulic work head motor, the shearing forces experienced by the work head where it abuts and cuts the workpiece are proportional with torque in the output shaft of the work head motor and pressure in the hydraulic fluid inlet line feeding the work head motor.

Increases in work head torque, and corresponding inlet line pressure increases are related to a feed rate, also called advance rate, and associated feed forces which are exerted on the work head to drive the work head into the workpiece. It is desirable to properly select the feed rate for the work head so that the workpiece can be cut as quickly as possible without exceeding the maximum torque for which the work head cutting surface is designed.

When a workpiece being cut has irregular hardness and exerts variable shearing forces on the work head, advancing the work head at a constant feed rate can lead to periods of excessive torque and shear forces and corresponding excessive wear of the cutting surfaces of the work head. For instance, when concrete is being cut with a diamond tipped saw or drill bit, and the concrete has reinforcing steel therein, the work head will occasionally encounter this steel within the concrete. When the feed rate is manually adjusted by an operator, the all to common tendency is to accelerate the feed rate when obstacles such as rebar are encountered to "push through" such an obstacle. In fact, to maintain torque and shear forces on the work head below maximum thresholds, a slower feed rate is called for until the reinforcing steel or other obstacles are passed. Accordingly, a need exists for a feed system for a hydraulic fluid powered work head which automatically adjusts the feed rate to keep torque shearing forces on the work head below acceptable threshold values.

SUMMARY OF THE INVENTION

With this invention the hydraulic fluid powered work head motor has its feed rate controlled by a feed motor or other advance which variably selects its feed rate depending on a pressure in an inlet line directing hydraulic fluid to the work head motor. Preferably, the feed motor is in the form of a hydraulic motor fed by an elevated pressure hydraulic fluid feed line separate from the inlet line to the work head motor. While the feed rate of this feed motor could be modified and controlled in a variety of ways, in a preferred form of this invention the feed rate of the feed motor is controlled by a pressure sensitive valve diverting at least a portion of hydraulic fluid in the feed line away from the feed motor when the pressure sensitive valve senses an elevated pressure, in the hydraulic fluid inlet line directing hydraulic fluid to the work head motor, which exceeds a preset maximum.

Hence, when the work head motor encounters an obstacle which is causing elevated torque and shearing forces on the work head, and the corresponding hydraulic fluid inlet line pressure increases, this increase in pressure in the inlet line of the work head motor is sensed by the pressure sensitive valve. The valve then causes hydraulic fluid flow through the feed line to the feed motor to be at least partially disrupted, at least partially reducing the feed rate of the feed motor, and hence the advancing forces driving the work head into the workpiece. This decrease in feed rate in turn decreases the shearing forces experienced by the work head. Thus, an automatic control system is provided to advance the work head motor at an optimum speed for efficiently cutting the workpiece and yet avoiding maximum shearing force thresholds when obstacles are encountered which exert increased shearing forces on the work head.

Preferably, the pressure sensitive valve is interposed between a hydraulic power unit supplying elevated pressure hydraulic fluid to the feed motor, and a feed line exiting the valve and extending on to the feed motor. A piston or other movable element within the valve has a first position which allows hydraulic fluid to pass from the hydraulic power unit to the feed motor through the feed line. The piston has a second position where the path from the hydraulic power unit to the feed motor is at least partially diverted. A sensor line preferably extends from the valve to the hydraulic fluid inlet line feeding the work head motor. This sensor line is oriented adjacent the piston so that pressure in the sensor line and the inlet line can cause the piston to move from the first position to the second position. The piston is biased towards the first position and remains in the first position unless the pressure in the inlet line exceeds the biasing force exerted on the piston. This biasing force is preferably adjustable so that a user can selectively set the preset maximum pressure for the inlet line of the work head motor and hence control maximum shearing forces which will be experienced by the work head.

OBJECTS OF THE INVENTION

Accordingly, a primary object of the present invention is to provide a system for controlling a feed rate of a work head through a workpiece so that the feed rate does not cause excessive torque and shearing forces to be encountered by the work head.

Another object of the present invention is to provide a feed system which maintains forces on the work head below a maximum threshold to avoid damage to the work head.

Another object of the present invention is to provide a feed system for a hydraulic motor powered work head which varies the feed rate of the work head when hydraulic fluid driving the work head motor increases above a preset maximum, indicating excessive forces on a cutting surface of the work head.

Another object of the present invention is to provide a system for optimizing a speed with which reinforced concrete is cut by automatically adjusting a feed rate of a work head cutting the concrete when reinforcing structures within the concrete are encountered by the work head.

Other further objects of the present invention will become apparent from a careful reading of the included drawing figures, the claims and detailed description of the invention.

DESCRIPTION OF THE PREFERRED EMBODIMENT

Figure 1:
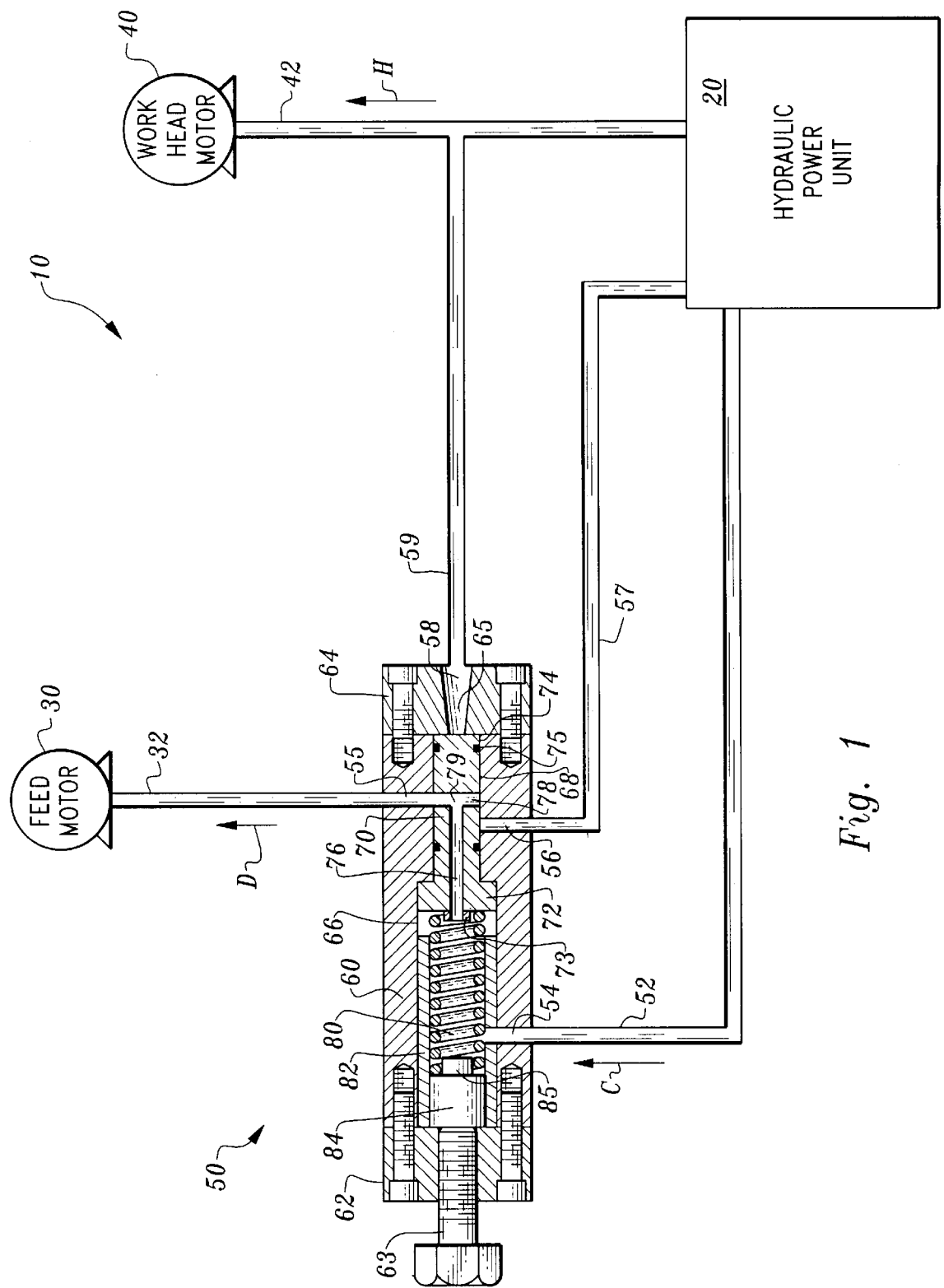
FIG. 1 is a schematic of the auto feed system of this invention with details of a pressure sensitive valve portion of the system shown in full section to illustrate how hydraulic fluid passes through the various components of the system, with hydraulic fluid return lines, other than a bypass line from the valve back to the hydraulic power unit omitted for clarity.

Referring to the drawings, wherein like reference numerals represent like parts throughout the various drawing figures, reference numeral 10 is directed to an automatic feed system for advancing a hydraulically powered work head through a workpiece. The system 10 is depicted in the preferred embodiment in use with a concrete G drilling or cutting apparatus where the work head is a diamond drill cutting tool 46 driven by a hydraulic fluid powered work head motor 40 that is advanced by a feed motor 30. The system 10 is particularly adapted to adjust a feed rate that the feed motor 30 advances the diamond drill cutting tool 46 or other work head through the concrete G or other workpiece when structures such as reinforcing steel R are encountered.

Figure 6:
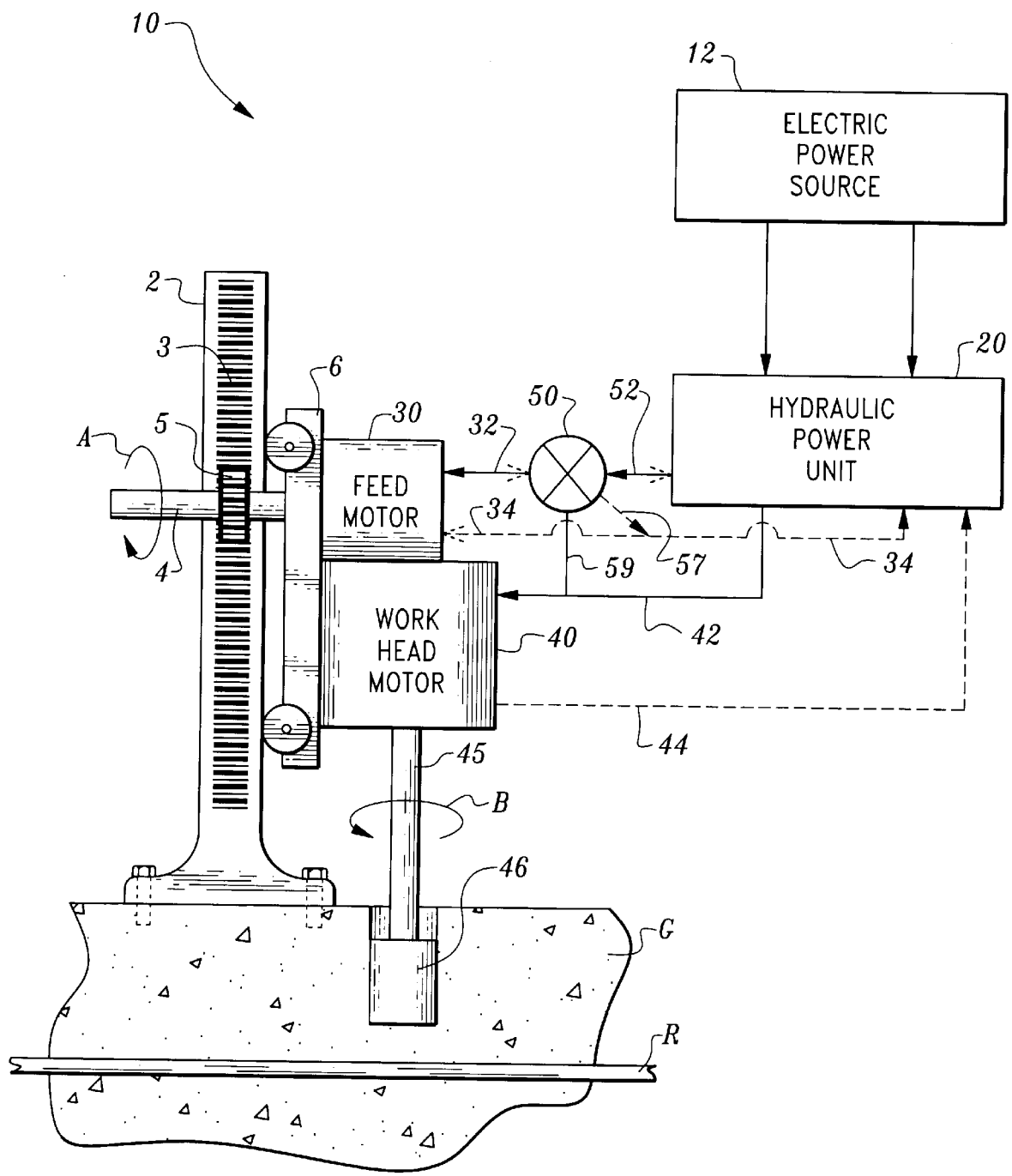
FIG. 6 is a schematic view depicting a typical application of the auto feed system of this invention to drill reinforced concrete.

In essence, and with particular reference to FIGS. 1 and 6, the basic features of the system 10 of this invention according to the preferred embodiment are described. Hydraulic fluid is pressurized and delivered by a hydraulic power unit 20 to the feed motor 30 and the work head motor 40. This feed motor 30 and work head motor 40 are both preferably driven by elevated pressure hydraulic fluid with the two motors 30, 40 preferably coupled together physically. The motors 30, 40 are mounted upon a support tower 2 or other structure with which the feed motor 30 can engage to advance the work head motor 40 and an associated diamond cutting tool 46 or other work head cutting tool through the concrete G or other workpiece.

To minimize damage to the cutting surface of the diamond cutting tool 46 or other work head, it is desirable that the work head motor 40 drive the diamond cutting tool 46 in a manner which does not exceed a maximum torque which is associated with shearing forces on the cutting surface of the diamond cutting tool 46 which would cause damage to the diamond cutting tool 46. Work head motor 40 torque is related to a pressure of hydraulic fluid driving the work head motor 40.

A valve 50 is provided along a hydraulic fluid feed line 32 delivering hydraulic fluid to the feed motor 30. This valve 50 is pressure sensitive to a pressure of hydraulic fluid in an inlet line 42 delivering hydraulic fluid to the work head motor 40. The valve 50 controls flow of hydraulic fluid to the feed motor 30 and thus controls a feed rate with which the feed motor 30 advances the work head motor 40 and the associated diamond cutting tool 46 into the concrete G.

The valve 50 preferably includes a body 60 with a piston 70 residing in an interior thereof. The piston 70 is movable between a first position and a second position. In the first position the piston 70 allows hydraulic fluid to flow to the feed motor 30. In the second position, the piston 70 at least partially blocks flow of hydraulic fluid to the feed motor 30 so that a feed rate of the feed motor 30 is reduced.

The position of the piston 70 is controlled by a sensor line 59 branching off of the inlet line 42 delivering hydraulic fluid to the work head motor 40 to the valve 50, such that the pressure of the hydraulic fluid in the inlet line 42 influences the position of the piston 70 directly. A spring 80 is provided to bias the piston 70 toward the first position and keep the piston 70 in the first position unless the pressure in the inlet line 42 exceeds a preset maximum corresponding with a maximum torque of the work head motor 40 and associated shear forces experienced by the diamond cutting tool 46. Hydraulic fluid passing to the feed motor 30 also exerts a force on the piston 70 to further bias the piston 70 in the first position. The feed motor 30 thus automatically slows down a feed rate that the diamond cutting tool 46 is pushed into the concrete G when such a slower feed rate is desirable to decrease forces on the diamond cutting tool 46 which would otherwise damage the cutting surface of the diamond cutting tool 46.

More specifically, and with particular reference to FIG. 6, details are provided of the support tower 2 and associated structures which support the system 10 adjacent concrete G to be drilled or otherwise cut. While the preferred embodiment of the system 10 is shown in conjunction with a concrete G drilling operation, this invention is similarly applicable to concrete G cutting with a saw blade when the saw blade is driven by a hydraulic motor. In the preferred embodiment both the work head motor and the feed motor 30 are powered by hydraulic fluid. However, variations on this system within the scope of this invention could utilize a feed motor 30 of an other than hydraulic nature or an only partially hydraulic nature.

To drill the concrete G as efficiently as possible, both the weight of the work head motor 40 and associated equipment and additional advancing forces pushing down on the diamond cutting tool 46 are desirable. To provide such additional downward forces to maintain a desirable feed rate that the diamond cutting tool 46 cuts into the concrete G, the feed motor 30 is provided attached to the work head motor 40. The feed motor 30 and work head motor 40 can be mounted together upon a carriage 6 which can be of a rolling or a sliding type relative to a support tower 2.

The support tower 2 is preferably securely attached to the concrete G, but could alternatively be mounted to a sufficiently heavy object (i.e. a vehicle) so that the support tower 2 remains substantially in fixed position relative to the concrete G being drilled. In the preferred embodiment, the support tower 2 is bolted directly to the concrete G.

The support tower 2 includes a rack gear 3 on a surface thereof. This rack gear 3 is engaged by a pinion gear 5 mounted on a drive arm 4 extending from the feed motor 30. The drive arm 4 rotates (along arrow A of FIG. 6) as the feed motor 30 rotates. Typically, a significant gear reduction occurs between the feed motor 30 and the pinion gear 5 so that the feed motor 30 can operate at a relatively high speed and the pinion gear 5 can rotate slowly relative to the rack 3 and yet produce a desirably high downward force on the diamond cutting tool 46 as the diamond cutting tool 46 cuts into the concrete G. Other gearing arrangements could be used to move the drive arm 4 relative to the tower 2.

While the carriage 6 is shown with wheels, the carriage 6 could merely slide along a track provided upon the support tower 2 or be otherwise coupled to the support tower 2 in a manner which allows vertical movement of the feed motor 30 and work head motor 40 but which restricts the feed motor 30 and work head motor 40 from moving laterally or rotating relative to the support tower 2 and hence relative to the concrete G being drilled. Typically, the support tower 2 and associated structures would be appropriately adjustable so that the diamond cutting tool 46 coupled to the work head motor 40 can be precisely located where desired for drilling the concrete G without requiring that the support tower 2 be precisely positioned in advance.

With continuing reference to FIG. 6, details of the hydraulic power unit 20 are described. In the preferred embodiment both the feed motor 30 and work head motor 40 are driven by elevated pressure hydraulic fluid. Preferably, the elevated pressure hydraulic fluid is generated within the hydraulic power unit by hydraulic fluid pumps. These pumps are preferably powered by an electric power source 12. Alternatively, any appropriate motor having the needed horsepower can be utilized. The pumps within the hydraulic power unit 20 preferably are separate with a relatively low horsepower pump feeding elevated pressure hydraulic fluid to the feed motor 30 and a relatively high horsepower hydraulic pump feeding hydraulic fluid to the work head motor 40.

In one form of the invention as an example, the high horsepower hydraulic pump delivers hydraulic fluid at approximately 1200 psi to the work head motor 40 and the low horsepower pump delivers hydraulic fluid at 200 psi to the feed motor 30. As will be described in detail below, the pressure actually delivered to the feed motor 30 downstream of the valve 50 is adjustable to adjust the feed rate of the feed motor 30 and hence the feed rate of the work head motor 40 and diamond cutting tool 46 when needed. When the pressure driving the feed motor 30 is reduced, it is typically reduced as an example to approximately 0 psi from 200 psi.

The hydraulic power unit 20 can have a single reservoir of hydraulic fluid to feed both the high horsepower and low horsepower pumps or each of the pumps can operate off of separate reservoirs. FIG. 6 depicts the return line 34 from the feed motor 30 and the outlet line 44 from the work head motor 40 which return hydraulic fluid from the motors 30, 40 back to the hydraulic power unit 20 for repressurization with the pumps and return to the feed motors 30, 40. The return line 34 and outlet line 44 are shown in broken lines to distinguish them from the elevated pressure hydraulic fluid lines which deliver elevated pressure hydraulic fluid to the feed motor 30 and work head motor 40. For simplicity, the return line 34 and outlet line 34 are omitted from FIG. 1.

With particular reference to FIGS. 1 and 6, details of the feed motor 30 and work head motor 40 are described. The feed motor 30 is preferably driven by hydraulic fluid from the hydraulic power unit 20. However, the basic function provided by the feed motor 30 is that of advancing the diamond cutting tool 46 into the concrete G at a desired feed rate and exerting an advancing force on the diamond cutting tool 46 which is desirable for most efficient drilling/cutting of the concrete G. Hence, it is conceivable that structures other than the feed motor 30 could provide this function. For instance, a hydraulic cylinder or hydraulic ram fed with hydraulic pressure could directly provide the desired advancing force and feed rate on the diamond cutting tool 46, either by pushing against the work head motor 40 and pushing the diamond cutting tool 46 through the output shaft 45, or by otherwise pushing directly upon the diamond cutting tool 46 or other output shaft 45. Similarly, non-hydraulic or partially hydraulic force applying structures other than the feed motor 30 of the preferred embodiment could be utilized to provide this advancing force.

With the hydraulic feed motor 30 of the preferred embodiment, the feed motor 30 would be configured as a typical hydraulic motor with an impeller fed by elevated pressure hydraulic fluid. Elevated pressure hydraulic fluid would cause the impeller to rotate, in turn rotating the drive arm 4 coupled to the impeller so that the feed motor 30 causes the drive arm 4 to rotate. An appropriate transmission can be interposed between the impeller of the feed motor 30 and the drive arm 4 so that the desired speed and torque for the drive arm 4 can be provided different from the speed of the impeller of the feed motor 30.

If desired, the feed motor 30 can have a control system which allows an operator to set operating parameters for the feed motor 30. For instance, a feed rate for the feed motor 30 and advancing force provided by the feed motor 30 could be set. Also, other parameters such as the amount of feed distance, and hence the depth of cut into the concrete G and other desirable feed motor 30 control parameters could be set.

The work head motor 40 is preferably securely attached to the feed motor 30, either through the common carriage 6 or by otherwise directly coupling the feed motor 30 to the work head motor 40. As an alternative, it is only strictly necessary that the feed motor 30 advance the diamond cutting tool 46. Hence, the feed motor 30 could be coupled to the output shaft 45 of the work head motor 40 or to the diamond cutting tool 46 of the work head motor 40 in a force applying fashion, rather than coupled to the work head motor 40.

The work head motor 40 is preferably of similar configuration to the preferred feed motor 30 such that it includes an impeller driven by elevated pressure hydraulic fluid from the hydraulic power unit 20. As the impeller within the work head motor 40 rotates, it causes the output shaft 45 to rotate (about arrow B of FIG. 6) and in turn causes the diamond cutting tool 46 to rotate. A cutting surface of the diamond cutting tool 46 grinds away at the concrete G or other workpiece.

In the preferred embodiment where both the feed motor 30 and the work head motor 40 are driven by elevated pressure hydraulic fluid, a series of lines are provided to deliver hydraulic fluid to the motors 30, 40 and return hydraulic fluid to the hydraulic power unit 20. Specifically, an input line 52 delivers hydraulic fluid from the hydraulic power unit 20 to the valve 50 and then the feed line 32 carries the hydraulic fluid on to the feed motor 30. The return line 34 (shown in broken lines in FIG. 6) returns the hydraulic fluid from the feed motor 30 back to the hydraulic power unit 20 for repressurization and reuse to drive the motors 30, 40.

An inlet line 42 delivers elevated pressure hydraulic fluid from the hydraulic power unit 20 to the work head motor 40. An outlet line 44 returns this hydraulic fluid from the work head motor 40 back to the hydraulic power unit 20. The outlet line 44 is shown in broken lines in FIG. 6. The return line 34 and outlet line 44 are omitted from FIG. 1 for clarity. It is not strictly required that the return line 34 and outlet line 44 return the hydraulic fluid back to the hydraulic power unit 20. For instance, if the hydraulic fluid were water, it is conceivable that the hydraulic fluid could be exhausted from the motors 30, 40 into a surrounding atmosphere. The fluid could also be air or other compressible propellants. Similarly, if environmental conditions allow, any other form of hydraulic fluid could be discharged at the motors 30, 40. Typically however, hydraulic fluid outputted from the motors 30, 40 would be returned back to the hydraulic unit 20 for repressurization and reuse after any desired level of filtration and cooling has taken place.

While the hydraulic fluid lines 32, 34, 52 which feed hydraulic fluid to the feed motor 30 are shown with solid arrowheads depicting the direction of flow of the hydraulic fluid, the feed motor 30 is preferably reversible. When the feed motor 30 is reversed, such as when it is desired that the feed motor 30 be utilized to pull the work head motor 40 and the associated diamond cutting tool 46 up out of a hole drilled in the concrete G, the flow of hydraulic fluid along lines 32, 34 and 52 is in fact reversed. Broken line arrowheads are provided in FIG. 6 to depict the direction of hydraulic fluid flow when the feed motor 30 is in fact operating in such a reverse direction.

Figure 2:
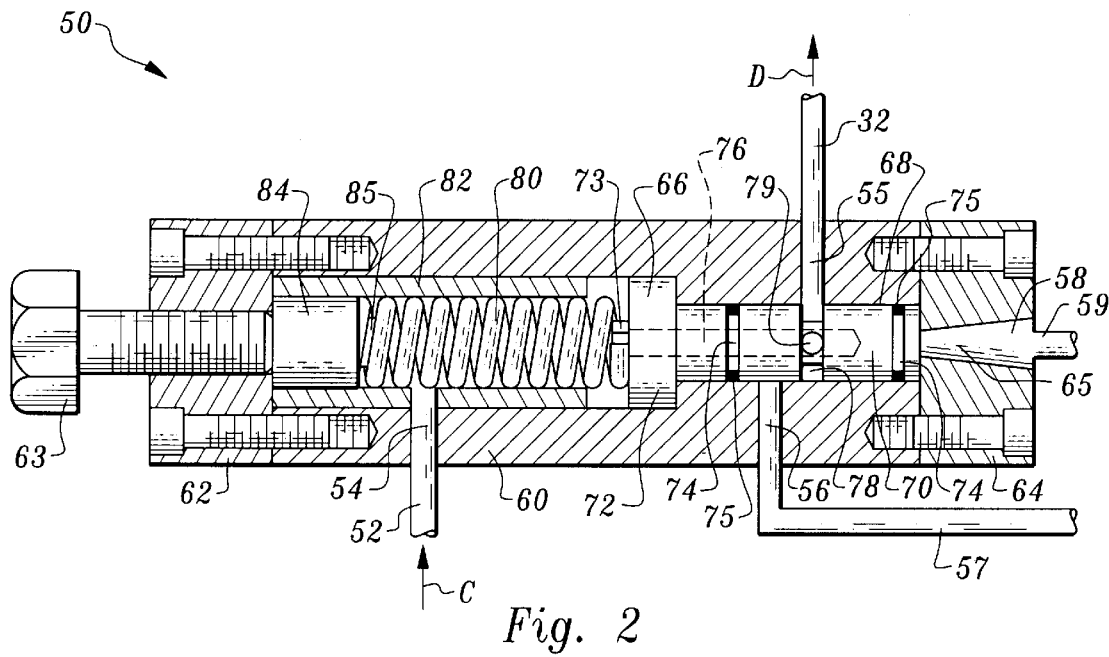
FIG. 2 is a detail of the valve portion of that which is shown in FIG. 1.
Figure 3:
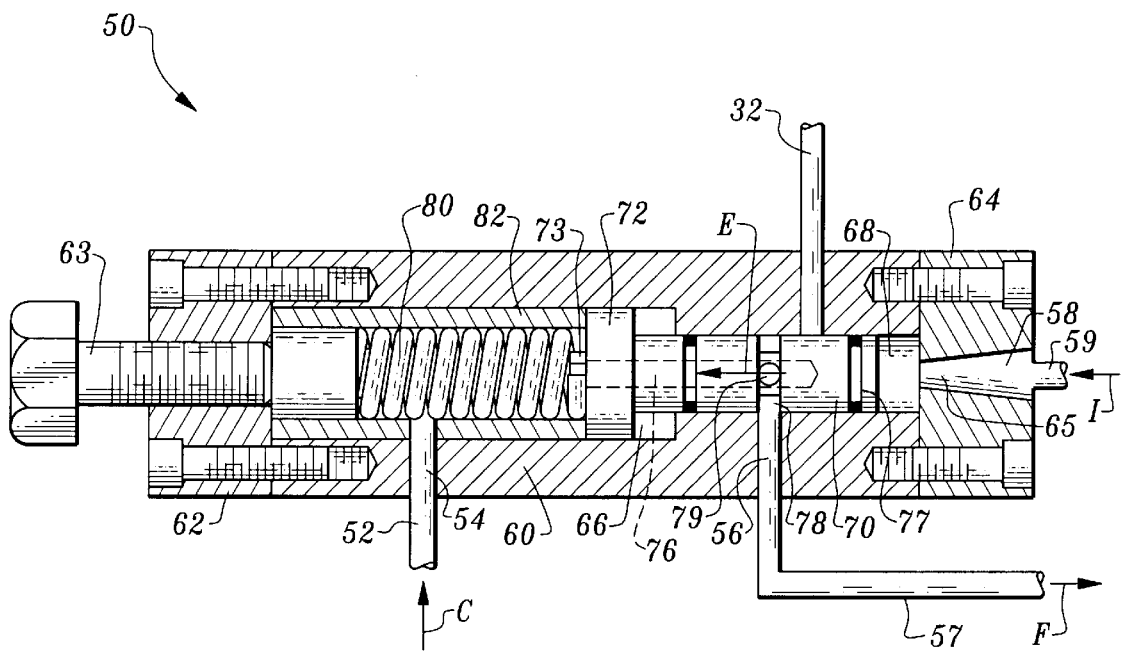
FIG. 3 is a full sectional view of the valve of FIG. 1 with the piston shown in a second position diverting hydraulic fluid to a bypass line, rather than the feed line for the feed motor.
Figure 4:
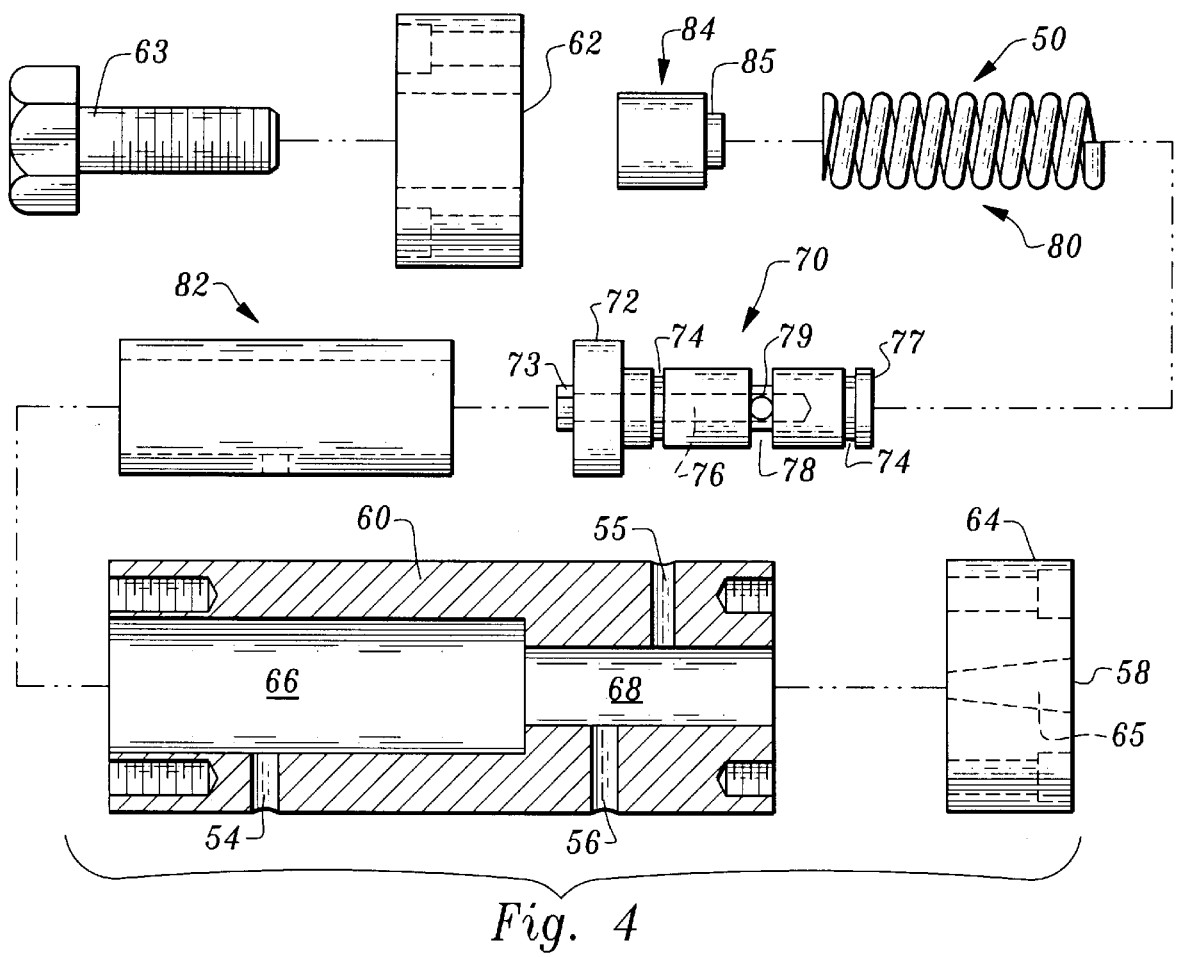
FIG. 4 is an exploded parts view of the valve of this invention.

With particular reference to FIGS. 2–4, details of the valve 50 are described. The valve 50 of the preferred embodiment is configured to be in fluid communication with a variety of different lines through ports in the valve 50. Specifically, an input line 52 leads from the hydraulic power unit 20 (FIG. 6) into the valve 50 (along arrow C of FIGS. 1 through 3). An entrance port 54 defines a location where the input line 52 enters the valve 50. An exit port 55 is coupled to the feed line 32 and delivers hydraulic fluid from the valve 50 to the feed motor 30 (along arrow D of FIGS. 1 and 2). A bypass port 56 is provided in the valve 50 which provides a second route for hydraulic fluid to exit the valve 50, other than the exit port 55. The bypass port 56 is coupled to a bypass line 57 which returns hydraulic fluid back to the hydraulic power unit 20 (along arrow F of FIG. 3). The bypass line 57 can either go directly back to the hydraulic power unit 20 or can merely join with the return line 34 (FIG. 6) or outlet line 44 for return back to the hydraulic power unit 20.

The valve 50 additionally includes a sensor port 58 which enters into the valve 50. The sensor port 58 does not allow hydraulic fluid to pass through the valve 50, but rather only allows hydraulic fluid to enter the valve 50 somewhat and influence a position of the piston 70 within the valve 50. The sensor port 58 is coupled to a sensor line 59 which is coupled to the sensor port 58 and to the inlet line 42 which delivers elevated pressure hydraulic fluid to the work head motor 40 (along arrow H of FIG. 1). The sensor line 59 does not contain moving hydraulic fluid, other than an insignificant amount when the piston 70 is moving, but rather only provides a conduit so that a pressure in the inlet line 42 can influence the position of the piston 70 within the valve 50.

While it is preferred for simplicity that the sensor line 59 extend between the valve 50 and the inlet line 42 of the work head motor 40, it is only strictly necessary that a pressure signal correlating with the pressure in the inlet line 42 be delivered to the valve 50 to cause the piston 70 or other movable element within the valve 50 to move so that flow through the valve 50 is appropriately altered in response to this pressure signal. Hence, a pressure sensor or other pressure transducer could measure pressure in the inlet line 42 and an electronic signal or other signal could be delivered to the valve through an appropriate actuator to cause the piston 70 or other movable element within the valve 50 to be moved in response to this pressure signal, without the sensor line 59 being strictly necessary.

The valve 50 preferably includes a cylindrical body 60 in which the various ports 54, 55, 56 are formed. A first end cap 62 forms one end of the valve 50 and a second end cap 64 defines another end of the valve 50. Preferably, an adjustment screw 63 passes through the first end cap 62 to adjust the spring 80 or other piston biasing structure. The sensor port 58 is preferably formed in the second end cap 64 in the form of a sensor path 65 which allows a small amount of hydraulic fluid to pass through the second end cap 64 when the piston 70 moves away from the second end cap 64. Preferably, this sensor path 65 is tapered slightly as shown in FIGS. 1–4.

A central core of the body 60 preferably includes a large bore 66 at an end of the body 60 adjacent the first end cap 62 and a small bore 68 at an end of the body 60 adjacent the second cap 64. The large bore 66 has a diameter which accommodates the spring 80 and the small bore 68 has a diameter which accommodates the piston 70. The entrance port 54 extends entirely through the body 60 and into the large bore 66. The exit port 55 and bypass port 56 extend entirely through the body 60 and into the small bore 68. The exit port 55 and bypass port 56 are spaced different distances away from ends of the body 60 for reasons discussed in detail below.

The piston 70 is preferably an elongate cylindrical construct formed from a unitary rigid material. The piston 70 has a diameter over most of its length which is similar to a diameter of the small bore 68 so that the piston 70 can slide along a center line of the valve 50 within the small bore 68. The piston 70 includes a head 72 which is larger than the small bore 68 and similar in size to the large bore 66. The head 72 thus rests in a portion of the large bore 66 directly adjacent the small bore 68. A tip 73 of the head 72 is preferably slightly raised and assists in centering an end of the helical spring 80 within the large bore 66.

Preferably, two circumferential seal grooves 74 circumscribe the piston 70 at positions on opposite sides of the exit port 55 and bypass port 56 region. O-rings 75 or other seals rest in these seal grooves 74 and prevent hydraulic fluid from leaking around sides of the piston 70 between the piston 70 and the small bore 68.

A central bore 76 passes through the tip 73 and head 72 and into a center of the piston 70, preferably along a center line of the piston 70. The central bore 76 stops short of passing all the way through the piston 70. A notch 78 is formed between the two seal grooves 74. The notch 78 has at least one port 76 resting within the notch 78 which passes entirely through to the central bore 76. Hence, hydraulic fluid can pass from the large bore 66 into the piston 70 at the head 72 and through the central bore 76, then through the port 79 into the notch 78. A base 77 defines an end of the piston 70 opposite the head 72.

The piston 70 has at least two positions including a first position and a second position. When the piston 70 is in the first position, it is preferably adjacent the second end cap 64 and adjacent the sensor port 58 and sensor path 65. This first position is the position in which the piston 70 is biased by the spring 80 pressing against the piston 70. When the piston 70 is in this first position, the notch 78 is preferably aligned with the exit port 55 of the valve 50. Hence, in this first position the piston 70 provides a pathway which can carry hydraulic fluid from the entrance port 54 (along arrow C of FIGS. 2 and 3) through the large bore 66, into the piston 70 and out of the piston 70 to the exit port 55 (along arrow D of FIG. 2) and on to the feed line 32 of the feed motor 30. When the piston 70 is in this first position, the valve 50 is hence allowing high pressure hydraulic fluid to pass from the hydraulic power unit 20 to the feed motor 30 for full operation of the feed motor 30 at a typical desired feed rate (FIG. 1).

When pressure in the inlet line 42 exceeds a preset maximum, this maximum being adjustable by rotation of the adjustment screw 63, the valve 50 can be caused to alter the flow of hydraulic fluid to the feed motor 30. Specifically, when a sufficient pressure is experienced in the hydraulic fluid inlet line 42, this elevated pressure hydraulic fluid which also extends into the sensor path 65 in the second end cap 64 and against the base 77 of the piston 70, will cause the piston 70 to move (along arrow E of FIG. 2) and to compress the spring 80. Hydraulic fluid can flow slightly along the sensor path 65 (along arrow I of FIG. 2) to fill a portion of the small bore 68 which is vacated when the piston 70 moves along arrow E.

When the piston 70 moves to its second position (as shown in FIG. 3) hydraulic fluid entering the valve 50 through the entrance port 54 continues to flow through the piston 70 and through the central bore 76 to the notch 78, but then to the bypass port 56 and into the bypass line 57. Hence, hydraulic fluid is not delivered to the feed motor 30 and a feed rate of the feed motor 30 drops to zero.

Most precisely, when pressure above the preset maximum is exceeded in the inlet line 42 and the piston moves to the second position (FIG. 3), flow of hydraulic fluid to the feed motor 30 drops to zero but the feed rate is reduced but not dropped to zero initially. Rather, energy is stored in the support tower and other support structures when the feed motor 30 is driven, in the form of bending loads on the tower and strain on the various feed motor 30 support structures. This stored energy is slowly released when the feed motor 30 is not driven, causing the workload to advance slowly. Hence, the diamond cutting tool 46 would still tend to advance through the concrete G even when the feed motor 30 is no longer exerting advancing forces on the diamond cutting tool 46. After this stored energy is fully released, the inlet line 42 pressure will decrease because the feed rate is near or at zero. The piston 70 will then move toward the first position and some flow to the feed motor 30 will be restored and limited feed rate restored, until the obstacle has been cleared. The piston 70 remains in the first position until excessive pressures beyond the desired preset maximum are exceeded. When the piston 70 begins to move (along arrow E of FIG. 3) but before it has moved entirely to the second position, the exit port 55 of the valve 50 will start to be constricted slightly. When this constriction begins, the pressure of the hydraulic fluid feeding the feed motor 30 through the feed line 32 will drop to a lower level.

Figure 5:
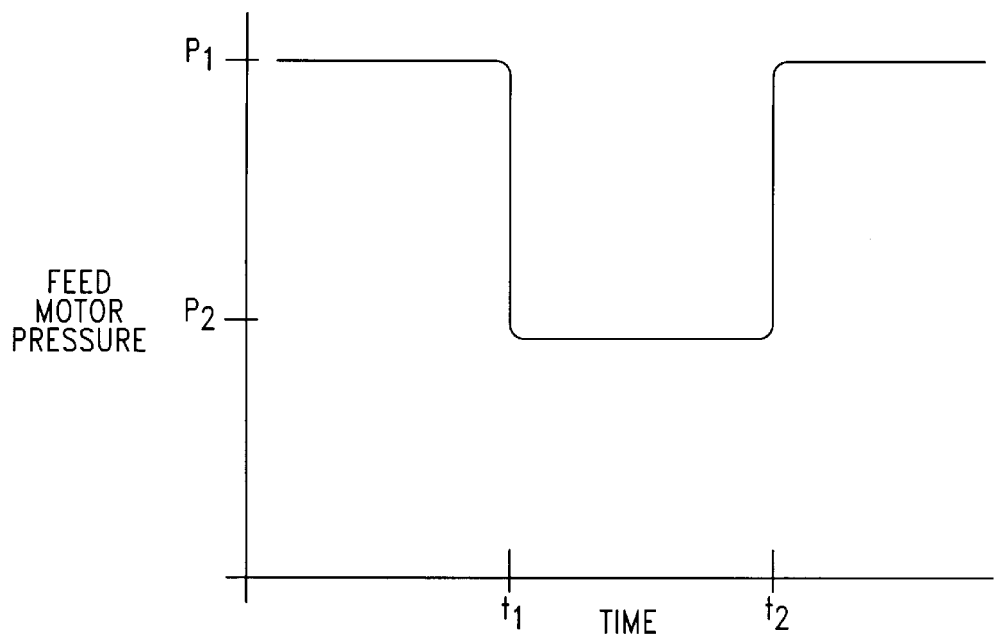
FIG. 5 is a graph illustrating how feed motor pressure decreases when an obstacle such as reinforcing steel in a concrete workpiece is encountered and the system of this invention is activated to reduce feed motor pressure to slow down a feed rate of the work head and maintain shearing forces encountered by the work head below a desired maximum.

Once the reinforcing steel or other obstacle has been cleared by the diamond cutting tool 46, the pressure will quickly be reduced in the inlet line 42 and the piston 70 will return to the first position. FIG. 5 depicts this change in feed motor pressure and corresponding change in feed rate and advancing force with P1 corresponding with the piston 70 in the first position and P2 illustrating the feed motor pressure when the piston 70 has moved toward the second position. T1 illustrates when the inlet line 42 pressure first increases due to the reinforcing steel R or other obstacle being hit by the diamond cutting tool 46. T2 illustrates when this obstacle has been cleared and the feed motor pressure returns from P2 to P1. In one form of this invention as an example P1 is 200 psi and P2 is 0 psi.

The spring 80 is preferably a helical coil spring residing within the large bore 66 of the valve 50. A sleeve 82 is also located within the large bore 66 and helps to keep the spring 80 centered. The primary function of the sleeve 82 is to stop the piston 70 from moving beyond the second position within the small bore 68. Specifically, the head 72 of the piston 70 abuts the sleeve 82 when the piston 70 is in the second position because the head 72 has a greater diameter than an inside diameter of the sleeve 82. The spacer 84 can be provided between the adjustment screw 63 and the spring 80 so that the adjustment screw 63 can both support an end of the spring 80 and compress the spring 80 when the adjustment screw 63 is rotated. A tip 85 of the spacer 84 is provided similar to the tip 73 and the head 72 to keep the spring 80 aligned.

The positions of the exit port 55 and bypass port 56 are carefully selected for proper operation of the valve 50. While various different configurations for the exit port 55 and bypass port 56 could be provided depending on the particular circumstances in which the valve 50 is being employed, preferably the exit port 55 and bypass port 56 are spaced so that the bypass port 56 begins to be opened before the exit port 55 is totally closed. In this way, flow of hydraulic fluid is never stopped by the valve 50, but rather is merely diverted from the exit port 55 and the feed motor 30 to the bypass port 56 and the bypass line 57 back to the hydraulic power unit 20 (such as along arrow F of FIG. 3). When it is desired to reverse the feed motor 30, the pressure in the inlet line 42 would typically be low because the feed motor 30 is in fact backing the diamond cutting tool 46 away from the concrete G. Hence, the piston 70 will be securely in the first position and reverse direction hydraulic flow can occur from the feed motor 30, through the feed line 32 back to the valve 50 and then through the input line 52 from the valve 50 back to the hydraulic power unit 20. Hence, the valve 50 does not interrupt operation of the feed motor 30 in reverse.

While the details of the valve 50 have been described in detail, the specific positions of the various ports and bores in the components of the valve 50 could be adjusted to alter the performance of the valve 50 or to otherwise improve or alter the function of the valve 50 while the valve 50 would still provide the basic function according to this invention. In other configurations the valve 50 would still cause a feed rate of the feed motor 30 or other advance to be appropriately modified in response to elevated pressure in the inlet line 42 of the work head motor 40. The piston 70 could be biased utilizing a variety of different biasing structures as is known in the art, as appropriate alternatives to the spring 80. The adjustment screw 68 could be replaced with other devices to other adjust forces applied by the spring 80 or to otherwise adjust any other biasing structure to bias the piston 70 toward the first position. Similarly, other movable valve elements within the valve 50 could replace the piston 70 and provide the basic function of diverting hydraulic fluid from the exit port 55 to the bypass port 56 or to otherwise cause a feed rate of the feed motor 30 or other advance to be diminished in response to pressure in the inlet line 40 of the work head 40.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified. When elements are described as coupled together, they may either be directly coupled together or only indirectly through intervening elements. Similarly, coupled elements may be securely affixed to each other or joined in a fashion allowing some relative movement therebetween.

What is claimed is:

1. A method for controlling a feed rate of a compressed propellant feed motor coupled to a compressed propellant work head motor powering a work head cutting into a workpiece, including the steps of:
   driving the work head motor with a compressed propellant fluid inlet line;
   driving the feed motor with a compressed propellant fluid feed line;
   sensing a pressure in the inlet line; and
   diverting at least a portion of the compressed propellant fluid from the feed line to bypass the feed motor when pressure in the compressed propellant fluid inlet line sensed by said sensing step exceeds a preset maximum, such that the feed rate of the feed motor is reduced.

2. The method of claim 1 including the further step of restoring the feed rate of the feed motor when the pressure sensed by said sensing step drops below the preset maximum of said diverting step.

3. The method of claim 1 wherein said diverting step includes the step of providing a pressure sensitive valve on said compressed propellant fluid feed line, the valve having a compressed propellant fluid input line coupled to a source of elevated pressure compressed propellant fluid such that elevated pressure compressed propellant fluid enters the valve, the valve having the compressed propellant fluid feed line in fluid communication with the compressed propellant fluid input line when the pressure sensed by said sensing step is below the preset maximum of said diverting step, and a bypass line in fluid communication with the input line when the pressure sensed by said sensing step exceeds the preset maximum of said diverting step.

4. The method of claim 3 wherein the valve of said providing step includes a piston slidable between two positions, the piston having pathways therethrough which selectively join the input line to either the feed line or the bypass line.

5. The method of claim 4 wherein said providing step includes biasing the piston toward a position which connects the input line to the feed line.

6. The method of claim 5 wherein said providing step includes the step of providing a sensor path in the valve in fluid communication with the compressed propellant fluid inlet line and a surface of the piston; and
   moving the piston away from the sensor path and away from the biased position to a position placing the input line in fluid communication with the bypass line when a pressure within the sensor path exceeds the preset maximum.

7. The method of claim 6 wherein said providing step includes the step of biasing the piston with a spring abutting a surface of the piston opposite the sensor path.

8. The method of claim 7 wherein said biasing step includes the step of adjusting a biasing force the spring exerts on the piston, such that the preset maximum of said diverting step is adjusted.

9. A concrete cutting system, comprising in combination:
   a compressed propellant work head motor having an output shaft coupled to a work head;
   a compressed propellant fluid inlet line connected to said work head motor to deliver compressed propellant fluid to said work head motor;
   a compressed propellant feed motor coupled to said work head, said feed motor advancing said work head into the concrete;
   a compressed propellant fluid feed line connected to said feed motor to deliver compressed propellant fluid to said feed motor; and
   a pressure sensitive valve on said feed line, said valve diverting compressed propellant fluid from said feed motor when a pressure in said inlet line exceeds a preset maximum.

10. The system of claim 9 wherein said work head is a saw blade.

11. The system of claim 9 wherein said work head is a drill bit.

12. The system of claim 9 wherein said feed motor is held in fixed position relative to said work head motor.

13. The system of claim 9 wherein said valve includes an input compressed propellant fluid line extending from a source of elevated pressure compressed propellant fluid to said valve, said valve including an exit port coupled to said compressed propellant fluid feed line and a movable valve element controlled by the pressure in said inlet line, said movable valve element positioned to maintain an open path between said input line and said feed line when the pressure within said inlet line is below said preset maximum and said movable valve element at least partially blocks said path between said input line and said feed line when the pressure in said inlet line exceeds said preset maximum.

14. The system of claim 13 wherein said movable element is a piston, said piston slidable between a first position providing a path between said input line and said feed line and a second position at least partially blocking said path between said input line and said feed line.

15. The system of claim 14 wherein said piston is biased toward said first position, said piston movable away from said first position when the pressure in said inlet line exceeds said preset maximum.

16. The system of claim 15 wherein a surface of said piston facing at least partially away from said second position is adjacent a sensor port in fluid communication with said inlet line, such that pressure within said inlet line pushes against said piston and can move said piston from said first position to said second position when pressure in said inlet line exceeds a biasing force biasing said piston toward said first position.

17. The system of claim 16 wherein said piston includes a base at least partially facing a sensor path in fluid communication with said inlet line and a head on a portion of said piston opposite said base, said head adjacent a biasing spring, said biasing spring oriented to exert a biasing force against said head of said piston to keep said piston in said first position except when the pressure in said inlet line is sufficient to move said piston from said first position to said second position and compress said biasing spring.

18. A work head torque limiting concrete cutting system comprising in combination:
   a rotating work head coupled to an output shaft of a compressed propellant fluid powered work head motor;
   a work head advance, said advance applying an advancing force on said work head pushing said work head against the concrete; and
   said advance exerting an advancing force on said work head which decreases when a pressure of compressed propellant fluid driving said work head motor increases.

19. The system of claim 18 wherein said advance is a compressed propellant feed motor driven by a compressed propellant fluid feed line, said compressed propellant fluid feed line including a valve thereon which at least partially closes said compressed propellant fluid feed line when pressure in said compressed propellant fluid inlet line driving said work head motor experiences a pressure exceeding a preset maximum.

20. A method for maintaining torque on a compressed propellant motor powered work head cutting through a workpiece below a preset maximum, including the steps of:
   sensing a pressure of compressed propellant fluid directed to the compressed propellant motor driving the work head, the pressure related to a torque experienced by the work head while cutting the workpiece;
   advancing the work head into the workpiece at an adjustable feed rate; and
   selecting the feed rate of said advancing step to decrease when the pressure in the inlet line increases above a preset maximum, such that a maximum preset torque limit for the work head is not exceeded.

21. The method of claim 20 wherein said advancing step includes the step of providing a feed motor coupled to the work head, the feed motor driven by a compressed propellant fluid feed line with an advancing force of the feed motor upon the work head proportional to a pressure of the compressed propellant fluid in the feed line; and
   reducing the compressed propellant pressure in the feed line when the compressed propellant pressure in the inlet line directed to the work head motor increases above a preset maximum.

22. A method of cutting a workpiece with a cutting tool rotated relative to the workpiece by a compressed propellant work head drive motor and advanced in the workpiece by a compressed propellant cutting tool advance, including the steps of:
   sensing obstacles to cutting in the workpiece by sensing increased pressure in a compressed propellant fluid inlet line feeding the compressed propellant work head motor to rotate the cutting tool relative to the workpiece;
   automatically slowing down the compressed propellant cutting tool advance in response to the increasing compressed propellant pressure in the work head motor inlet line;
   cutting through the sensed obstacle in the workpiece with the cutting tool by driving the cutting tool with the slowed-down feed motor;
   automatically restoring the speed of the slowed-down cutting tool advance in response to a decrease in pressure in the inlet line of the work head motor; and
   advancing the cutting tool in the workpiece with the cutting tool advance at the restored speed.

* * * * *